United States Patent
Ökvist et al.

(10) Patent No.: US 11,584,268 B2
(45) Date of Patent: Feb. 21, 2023

(54) MOTOR VEHICLE AND METHOD OF CONTROLLING A SUSPENSION SYSTEM

(71) Applicant: Telefonaktiebolaget LM Ericsson (publ), Stockholm (SE)

(72) Inventors: Peter Ökvist, Luleå (SE); Tommy Arngren, Södra Sunderby (SE); Tomas Jönsson, Luleå (SE); Stefan Wänstedt, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 524 days.

(21) Appl. No.: 16/462,406

(22) PCT Filed: Nov. 23, 2016

(86) PCT No.: PCT/SE2016/051154
§ 371 (c)(1),
(2) Date: May 20, 2019

(87) PCT Pub. No.: WO2018/097769
PCT Pub. Date: May 31, 2018

(65) Prior Publication Data
US 2019/0366889 A1    Dec. 5, 2019

(51) Int. Cl.
*B60N 2/50*    (2006.01)
*B60N 2/02*    (2006.01)
(Continued)

(52) U.S. Cl.
CPC .......... *B60N 2/501* (2013.01); *B60N 2/0244* (2013.01); *G02B 27/0093* (2013.01); *B60N 2002/0268* (2013.01); *G02B 2027/0181* (2013.01)

(58) Field of Classification Search
CPC ............. B60N 2/501; B60N 2/0244; B60N 2002/0268; G02B 47/0093; G02B 2027/0181
(Continued)

(56) References Cited

U.S. PATENT DOCUMENTS

| 6,039,141 A | 3/2000 | Denny |
| 6,450,530 B1 | 9/2002 | Frasher et al. |

(Continued)

FOREIGN PATENT DOCUMENTS

| DE | 101 29 124 A1 | 1/2003 |
| DE | 10 2009 054 232 A1 | 5/2011 |

(Continued)

OTHER PUBLICATIONS

3 Technologies That Are Making Car Suspensions Smarter Than Ever, The State of the suspension is good. Very good, by Ezra Dyer—Apr. 6, 2015.
(Continued)

*Primary Examiner* — Krishnan Ramesh
(74) *Attorney, Agent, or Firm* — Baker Botts L.L.P.

(57) ABSTRACT

A display unit in a motor vehicle presents information to a first user located in a personnel site. A frame carries the personnel site and a suspension system between the frame and the personnel site has at least one adjustable suspension characteristic. While the motor vehicle is being operated, a control system repeatedly determines a first gaze point of the first user on the display unit. Variations in a position for the first gaze point over time are analyzed; and in response thereto, the control system generates a first control signal to the suspension system so as to reduce a fluctuation of the position for the first gaze point, if a repositioning of the first gaze point is out of synchronization with a displacement of the display unit.

20 Claims, 4 Drawing Sheets

(51) Int. Cl.
*G02B 27/00* (2006.01)
*G02B 27/01* (2006.01)

(58) Field of Classification Search
USPC .......................................................... 701/36
See application file for complete search history.

(56) References Cited

U.S. PATENT DOCUMENTS

| | | | |
|---|---|---|---|
| 6,614,344 B1 | 9/2003 | Frasher et al. | |
| 6,886,650 B2 | 5/2005 | Bremner | |
| 8,564,597 B2 | 10/2013 | Lindfors | |
| 2003/0230447 A1 | 12/2003 | Wulfert et al. | |
| 2004/0089488 A1 | 5/2004 | Bremner | |
| 2006/0136110 A1* | 6/2006 | Casey | E02F 9/26 702/56 |
| 2008/0158096 A1* | 7/2008 | Breed | G01S 15/88 340/436 |
| 2008/0290694 A1 | 11/2008 | Spellmeyer et al. | |
| 2012/0173069 A1* | 7/2012 | Tsimhoni | G01C 21/3664 701/25 |
| 2012/0215403 A1* | 8/2012 | Tengler | B60K 35/00 701/36 |
| 2013/0158791 A1* | 6/2013 | Contratto | B60N 2/525 297/344.12 |
| 2015/0360593 A1 | 12/2015 | Mahler et al. | |
| 2016/0193921 A1* | 7/2016 | Suzuki | G02B 27/01 701/36 |
| 2017/0123215 A1* | 5/2017 | Li | H04N 13/00 |
| 2018/0136000 A1* | 5/2018 | Rasmusson, Jr. | G05D 1/0044 |

FOREIGN PATENT DOCUMENTS

| | | |
|---|---|---|
| DE | 10 2015 015 676 | 7/2016 |
| WO | 2009 050747 A2 | 4/2009 |

OTHER PUBLICATIONS

Active Control of Seat Vibrations of a Vehicle Model Using Various Suspension Alternatives by Rahmi Guclu, Turkish J. Eng. Env. Sci.
Active Seat Suspension, dSpace News, dSpace GmbH—Mar. 2006.
Eye-Tracking Tech in the Samsung Galaxy S4? Say What? —CNET Mobile by Shara Tibken and Jessica Dolcourt—Mar. 13, 2613.
Integrated Seat and Suspension Control for a Quarter Car With Driver Model, Faculty of Engineering and Information Sciences—Papers by Haiping Du et al. —2012.
International Search Report for international application No. PCT/SE2016/051154—dated Aug. 21, 2017.
Extended European Search Report for Application No./Patent No. 16922053.0-1020/3544851 PCT/SE2016051154—dated Nov. 20, 2019.

* cited by examiner

MOTOR VEHICLE AND METHOD OF CONTROLLING A SUSPENSION SYSTEM

PRIORITY

This nonprovisional application is a U.S. National Stage Filing under 35 U.S.C. 371 of International Patent. Application Serial No. PCT/SE2016/051154 filed Nov. 23, 2016 and entitled "Motor Vehicle and Method of Controlling a Suspension System" which is hereby incorporated by reference in its entirety.

TECHNICAL FIELD

The invention relates to a motor vehicle, a corresponding method and control unit for a suspension system of a motor vehicle. The invention also relates to a computer program and a non-volatile data carrier.

BACKGROUND

Todays' motor vehicles often contain highly sophisticated systems for handling, roadholding and comfort. Moreover, a relatively large amount of information needs to be presented to the driver during operation of the vehicle. Naturally, this should be effected as efficiently as possible, and without influencing the road safety negatively. Below follows some examples of solutions in this area.

U.S. Pat. No. 6,886,650 describes an active seat suspension control system, which supports a seat with respect to a base mounted on a frame of a vehicle. The system includes a hydraulic actuator coupled between the seat and the base. A single accelerometer is attached to the base and generates a base acceleration signal in response to motion of the base. A control unit actively controls the hydraulic actuator as a function of the base acceleration signal. The control unit generates a base velocity signal by integrating the base acceleration signal, generates a seat position signal representing a position of the seat relative to the base, generates a seat position error signal representing a difference between a desired position and the seat position signal, and generates a command signal as a function of the velocity signal and of the position error signal. The control unit controls the actuator by applying the command signal thereto.

Güclü, R., "Active Control of Seat Vibrations of a Vehicle Model Using Various Suspension Alternatives", Turkish J. Env. Sci. 27 (2003), pp 361-373, 2001-10-12 examines the dynamic behavior of a non-linear 8 degrees of freedom vehicle model having active suspensions and a PID controlled passenger seat. The non-linearity occurs due to dry friction on the dampers. The suspensions are considered as McPherson strut-type independent suspensions. Three cases of control strategies are taken into account. In the first case, only the passenger seat is controlled. In the second case, only the vehicle body is controlled. In the third case, both the vehicle body and the passenger seat are controlled at the same time. Since the PID control method can be applied easily and is well known, it has an important place in control applications. The time responses of the non-linear vehicle model due to road disturbance and the frequency responses of the harmonically linearized non-linear vehicle model are obtained for each control strategy. At the end, the performances of these strategies are compared and discussed.

Consequently, solutions are known for adaptive control of the seat suspension in a vehicle. Indeed, such solutions may provide good comfort for the driver and the passengers. However, depending upon the conditions, e.g. with respect to bumpiness and vehicle speed, the adaptive seat suspension may deteriorate vehicle travelers' ability to read the gauges, instruments, displays etc. in the vehicle.

Further, to mitigate these problems, various approaches can be applied. For example, U.S. Pat. No. 8,564,597 reveals a solution for determining a minimum and optimum font size for information displayed on a display based on a predetermined set of criteria, and automatically adjusting the displayed information on the display using a module such that a size of a smallest font of the information is not smaller than the minimum font size and that a size of a main font of the information is not smaller than the optimum font size.

Such an adaptive font-size setting may certainly be useful. However, it cannot resolve all suspension-related readability problems in a motor vehicle. Consequently, improved technical solutions are needed.

SUMMARY

An object of the present invention is therefore to offer an improved solution for facilitating for at least one person in a motor vehicle with an adaptive suspension system to apprehend the information presented on a display in the vehicle, either via the vehicle's own information systems or through other presentation means therein.

According to one aspect of the invention, this object is achieved by a motor vehicle including a display unit, a personnel site, a frame, a suspension system and a control system. The display unit is configured to present information to a first user. The personnel site is configured to be occupied by the first user, and may thus be represented by for example a seat or a cab. The frame carries the personnel site, and the suspension system is configured to adjust at least one suspension characteristic between the frame and the personnel site while the motor vehicle is being operated. Further, while the motor vehicle is being operated, the control system is configured to perform the following: repeatedly determine a first gaze point of the first user on the display unit; analyze variations in a position for the first gaze point over time; and in response thereto, generate a first control signal to the suspension system so as to reduce a fluctuation of the position for the first gaze point, if a repositioning of the first gaze point is out of synchronization with a displacement of the display unit.

This motor vehicle is advantageous because it facilitates a subject's chances of acquiring information during operation of the vehicle over a wide spectrum of use cases, for instance ranging from map reading in bumpy terrain to racing at extreme speeds.

According to one embodiment of this aspect of the invention, the control system is configured to determine that the repositioning of the first gaze point is out of synchronization with the displacement of the display unit if a phase difference between a measured change in the position for the first gaze point and a measured displacement of the display unit exceeds a threshold value. Thus, only non-synchronizations over a certain magnitude will be compensated for. This, in turn, is advantageous because it reduces the computational burden in situations where the benefit from the compensation is marginal.

For example, the threshold value may be determined based on an analysis involving measuring movements of the personnel site relative to the frame, and measuring of movements of the display unit relative to the frame. Thereby, an objective compensation level can be set. However, as will be discussed below, according to the invention, the level at which the proposed compensation is activated can also be set on the basis of the first user's gaze behavior.

In any case, according to one embodiment of this aspect of the invention, the first control signal aims at adjusting the at least one suspension characteristic in such a manner that the phase difference between the measured change in the position for the first gaze point and the measured displacement of the display unit is reduced. Of course, this is likely to improve the first user's chances of acquiring information from the display unit. However, the driving comfort may deteriorate somewhat compared to if no such adjustment had been made.

According to another embodiment of this aspect of the invention, the control system is configured to generate the first control signal iteratively in response to the analysis of the variations in the position for the first gaze point. Hence, even though there may be no immediate readability improvement, the first user will gradually experience that the information presented on the display unit becomes easier to acquire.

According to another aspect of the invention, the above object is achieved by a method of controlling a suspension system between a frame and a personnel site of a motor vehicle while the motor vehicle is being operated by: obtaining, repeatedly, gaze-point data reflecting a first gaze point of a first user on a display unit in the motor vehicle; analyzing variations in a position for the first gaze point over time; and in response thereto, generating a first control signal to the suspension system. The first control signal causes adjustment of at least one suspension characteristic between the frame and the personnel site so as to reduce a fluctuation of the position for the first gaze point, if a repositioning of the first gaze point is out of synchronization with a displacement of the display unit. The advantages of this method, as well as the preferred embodiments thereof, are apparent from the discussion above with reference to the proposed motor vehicle.

According to a further aspect of the invention the object is achieved by a computer program containing instructions which, when executed on at least one processor, cause the at least one processor to carry out the above-described method According to another aspect of the invention the object is achieved by a non-volatile data carrier containing such a computer program.

According to yet another aspect of the invention, the above object is enabled by a control unit for a suspension system of a motor vehicle. The suspension system is presumed to be configured to adjust at least one suspension characteristic between a frame and a personnel site of the motor vehicle while the motor vehicle is being operated. The control unit contains means for, during operation of the motor vehicle, repeatedly obtaining gaze-point data representing a first user's gaze point on a first display unit in the motor vehicle. The control unit further contains means for providing an analysis of variations in a position for the first gaze point over time, and means for generating a first control signal to the suspension system in response to said analysis. Here, the first control signal is adapted to adjust at least one of the at least one suspension characteristic between the frame and the personnel site so as to reduce a fluctuation of the position for the first gaze point, if a repositioning of the first gaze point is out of synchronization with a displacement of the display unit. The advantages of this control unit, as well as the preferred embodiments thereof, are apparent from the discussion above with reference to the proposed motor vehicle.

According to another aspect of the invention, the above object is achieved by a control unit for controlling a suspension system of a motor vehicle. The suspension system, in turn, is configured to adjust at least one suspension characteristic between a frame and a personnel site of the motor vehicle while the motor vehicle is being operated. The control unit includes a processor and a memory, where the memory contains instructions executable by the processor, and whereby the control unit is operative to perform the following: repeatedly obtain gaze-point data representing a first user's gaze point on a display unit in the motor vehicle; provide an analysis of variations in a position for the first gaze point over time; and generate a first control signal to the suspension system in response to said analysis. The first control signal is adapted to adjust at least one of the at least one suspension characteristic between the frame and the personnel site so as to reduce a fluctuation of the position for the first gaze point, if a repositioning of the first gaze point is out of synchronization with a displacement of the display unit. The advantages of this control unit, as well as the preferred embodiments thereof, are apparent from the discussion above with reference to the proposed motor vehicle Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
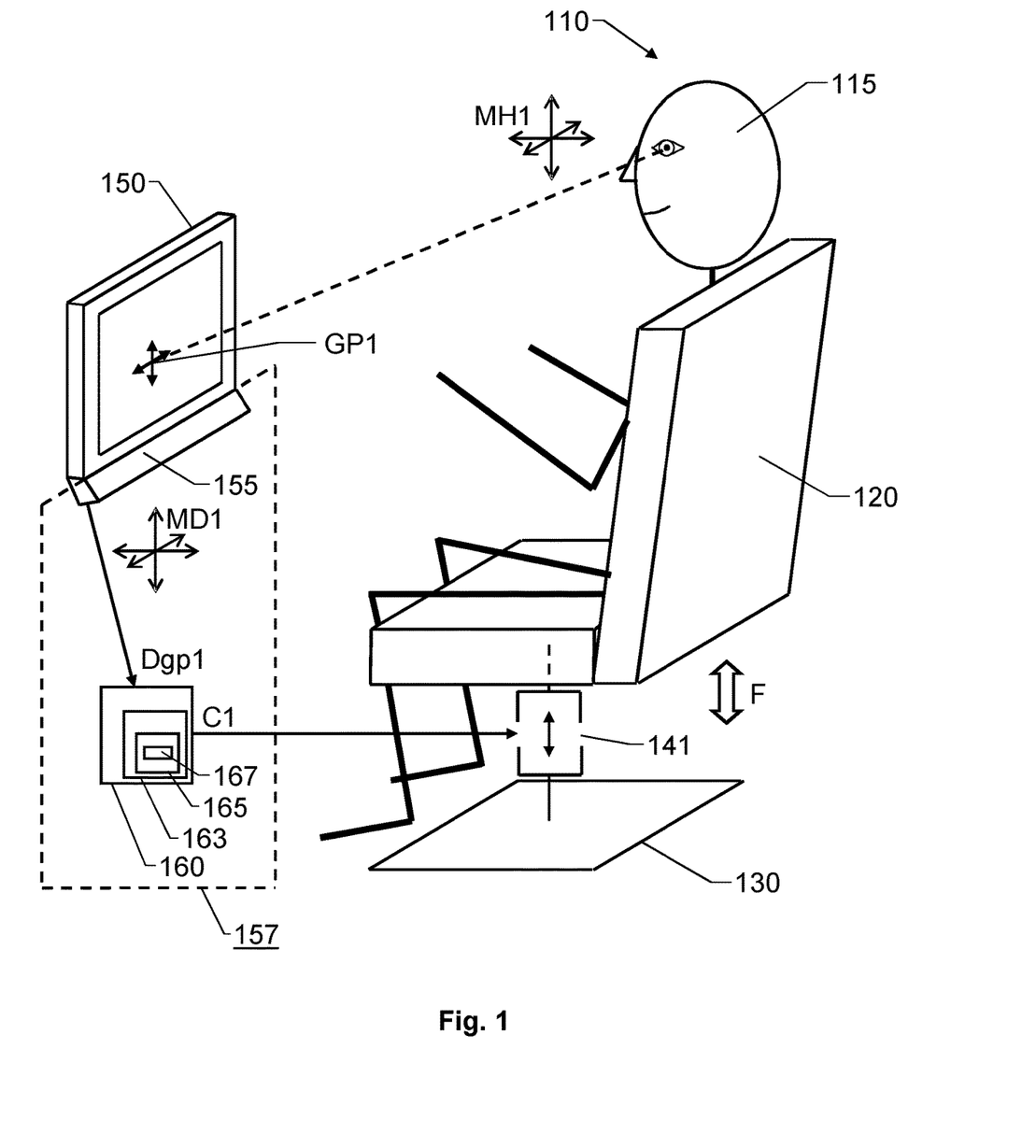
FIG. 1 schematically shows a first user occupying a seat of a motor vehicle, where the seat is adjustably suspended to a frame of the motor vehicle according to one embodiment of the invention.
Figure 2:
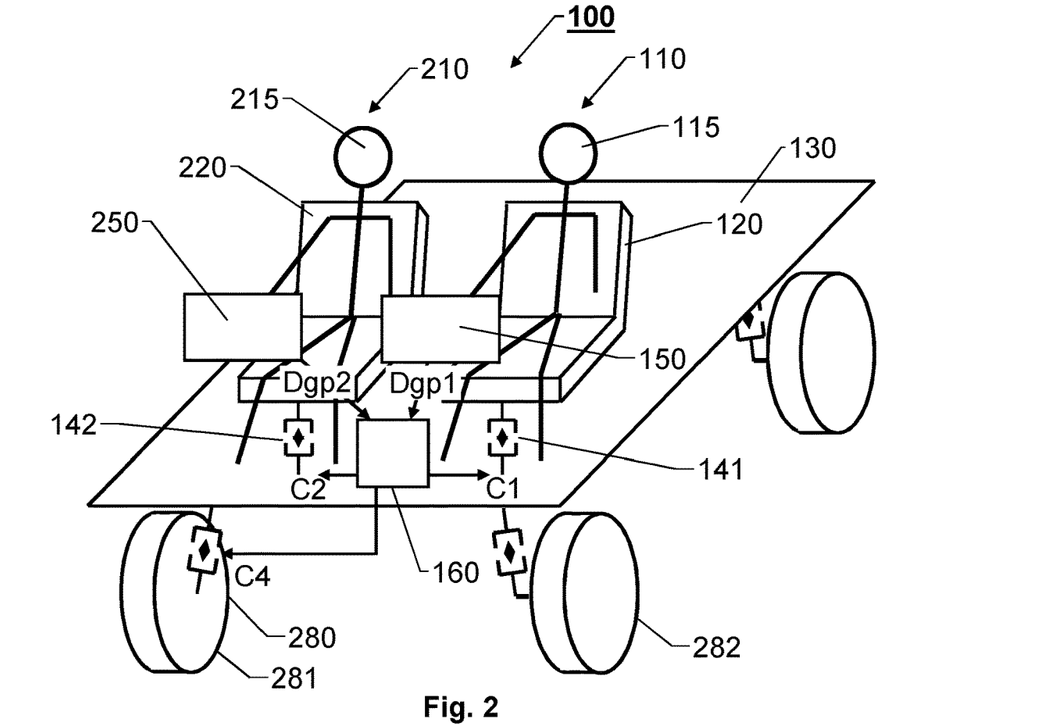
FIG. 2 illustrates one embodiment of the invention, where a second user occupies a second seat of the motor vehicle; which second seat is adjustably suspended to the frame via a separate suspension system.

FIG. 1 schematically shows a first user 110 occupying personnel site in the form of a seat 120 in a motor vehicle (see FIG. 2). Examples of motor vehicles are: cars, busses, trucks, boats and motorcycles, which are equipped with at least one motor for propelling the motor vehicle. Examples of motors are: combustion engines and electric motors.

A frame 130 carries the seat 120 via a suspension system 141, which is configured to adjust at least one suspension characteristic F between the frame 130 and the seat 120 while the motor vehicle is being operated. Here, operation of the motor vehicle is understood to include all events when the motor vehicle is powered/activated. For example, operation of the motor vehicle includes intervals when its engine idles, and causes some vibrations; however, the motor vehicle is neither driven forwards nor backwards. The suspension characteristics F may include spring suspension stiffness and/or a damping ratio of the suspension system 141. In so-called active suspension systems, the spring suspension stiffness and the damping ratio may be represented by one or more hydraulic (and/or pneumatic) cylinders that are adaptively adjustable with respect to speed/location of their supported mass.

The motor vehicle further contains a display unit 150 and a control system 157. The control system 157, in turn, preferably contains a control unit 160 and an eye-tracking system 155, which are either represented by separate elements (as illustrated in FIG. 1), or are integrated into a common element. The display unit 150 is configured to present information to the first user 110, either via a graphical interface, or by means of conventional buttons, dials, controls etc., or both. For example, the display unit 150 may show vehicle-related data such as speed, engine rpm, current gear, gear program, gas level etc. and/or other kinds of data, e.g. represented by a maps, navigation instructions or traffic information.

While the motor vehicle is being operated, the control system 157 is configured to repeatedly determine a first gaze point GP1 of the first user 110 on the display unit 150. To this aim, the control system 157 may contain an eye-tracking system 155, which may either be integrated into the display unit 150, or be embodied in a separate part associated thereto. As will be discussed below with reference to FIG. 2, such a separate part may be common to two or more display units in the motor vehicle.

In any case, the control system 157 is configured to analyze variations in a position for the first gaze point GP1 over time. In response to this analysis, the control system 157 is further configured to generate a first control signal C1 to the suspension system 141. The first control signal C1 is generated aiming at reducing a fluctuation of the position for the first gaze point GP1, if a repositioning of the first gaze point GP1 is out of synchronization with a displacement of the display unit 150.

Generally, the first control signal C1 aims to reduce a fluctuation of the position for the first gaze point GP1, where the fluctuation is deemed to result from movements of the first user's head 115 relative to the display unit 150, i.e. head movements and/or display movements respectively, caused by the operation of the motor vehicle. Here, specifically, the fluctuation of the position for the first gaze point GP1 is deemed to be caused by the operation of the motor vehicle, if the repositioning of the first gaze point GP1 is out of synchronization with a displacement of the display unit 150.

Figure 4:
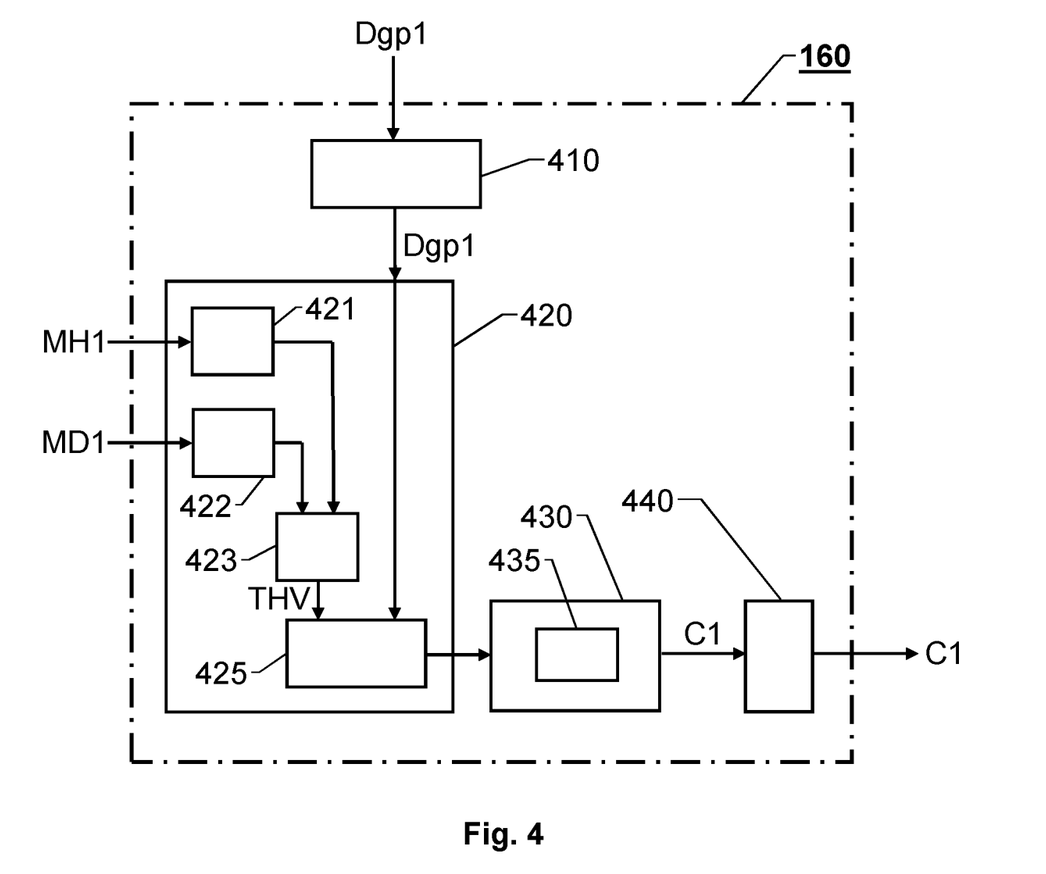
FIG. 4 shows a block diagram over a control unit according to one embodiment of the invention.

Referring now to FIG. 4, showing a block diagram over a control unit 160 according to one embodiment of the invention. The control unit 160 may be an apparatus which in the vehicle industry generally is denominated an electronic control unit (ECU). Here, the repositioning of the first gaze point GP1 is deemed to be out of synchronization with the displacement of the display unit 150, if a phase difference between a measured change in the position for the first gaze point GP1 and a measured displacement of the display unit 150 exceeds a threshold value THV.

The analysis of the variations in the position for the first gaze point GP1 over time may involve measuring movements MH1 of the personnel site 120 relative to the frame 130, and measuring of movements MD1 of the display unit 150 relative to the frame 130. Based on these measurements, in turn, the threshold value THV is determined.

Motion sensors are preferably associated with the personnel site 120 and the display unit 150 respectively in order to register the movements MH1 and MD1 relative to the frame 130. The motion sensors may include any type of sensors suitable for measuring displacement, e.g. accelerometers, gyroscopes, and/or magnetometers. Each motion sensor is configured to output a time-dependent signal, in other words a time-series of data d(t), reflecting the displacement of the device to which it is associated, i.e. the personnel site 120 and the display unit 150 respectively. Here, scalar displacement values d(t) may be used to reflect displacement along a current direction of displacement. Alternatively, a time-series of pairs of scalar values may be utilized, for instance pairs of values reflecting the displacement within a plane. As yet another alternative, a time-series of triplets of scalar values, i.e. vectors, may be employed, which reflect the current displacement in three-dimensional space.

According to one embodiment of the invention, the first control signal C1 aims at adjusting the at least one suspension characteristic F in such a manner that the phase difference between the measured change in the position for the first gaze point GP1 and the measured displacement of the display unit 150 is reduced. Below follows a disclosure of how this phase difference can be determined.

The control unit 160 may be represented by an ECU connected to a bus line in the motor vehicle, e.g. a Controller Area Network, Flexray bus, Ethernet bus or a Media Oriented Systems Transport bus. The ECU, in turn, may either be exclusively dedicated to the control unit 160, or the ECU may be shared with one or more additional functions in the motor vehicle. Alternatively, the control unit 160 may form an integral part of the suspension system 141, or another suspension system in the motor vehicle.

An eye-tracking system 155 may be employed to determine the first gaze point GP1. The eye-tracking system 155 is preferably based on conventional technology, and may thus include a camera (e.g. of IR type) configured to register image data representing the eye(s) of a subject, here exemplified by the first user 110, a set of illuminators (e.g. of IR type) and at least one processor for repeatedly calculating an updated gaze point. The eye-tracking system 155 is configured to output a time-dependent signal, i.e. a time-series of scalar values g(t) reflecting the first gaze point GP1. The time-series of data g(t) may for example describe an angle of a direction of the first user's 110 gaze relative to a reference axis defined in relation to the head 115. Alternatively, the time-series of data g(t) may reflect the first gaze point GP1 as such, i.e. the point of focus for the user's 110 eye(s) on the display unit 150.

The control system 157 may determine that the repositioning of the first gaze point GP1 is out of synchronization with the displacement of the display unit 150 in a number of ways. For instance, whether or not the repositioning of the first gaze point GP1 is deemed to be out of synchronization with the displacement of the display unit 150 can be determined by deriving a phase difference p(t) between the change in the first gaze point GP1, reflected by g(t), and the displacement of the display unit 150. Then, the change in the position of first gaze point GP1 is deemed to be out of synchronization with the displacement of the display unit 150 if the derived phase difference p(t), or an absolute value thereof, |p(t)|, exceeds a threshold value for a maximal phase difference. The phase difference p(t) may be derived by any known method being suitable for establishing the instantaneous phase difference between two time-dependent signals. As an example, this may be accomplished by calculating the Hilbert transform for each of the signals d(t) and g(t), i.e.:

$$H(d)(t) = \frac{1}{\pi} \text{p.v.} \int_{-\infty}^{+\infty} \frac{d(\tau)}{t - \tau} d\tau$$

and $$H(g)(t) = \frac{1}{\pi}\text{p.v.}\int_{-\infty}^{+\infty}\frac{g(\tau)}{t-\tau}d\tau,$$

respectively, where "p.v." denotes the Cauchy principal value. The Hilbert transform is commonly known in the field of signal processing where it is used for deriving an analytic expression of a signal, thereby extending the signal into the complex plane. For a discrete function, such as a time-series of measured values, the discrete Hilbert transform is typically used.

Subsequent to calculating the Hilbert transforms H(d)(t) and H(g)(t) for the measured signals d(t) and g(t), their respective instantaneous phase angles can be extracted. This may for example be achieved by utilizing a polar representation of the complex Hilbert transforms, in which a complex number z=x+yi is expressed using its absolute value $|z|=\sqrt{x^2+y^2}$ and its argument φ, commonly referred to as 'phase', as $z=|z|e^{i\varphi}$.

Finally, the instantaneous phase difference p(t) between the change in the position for the first gaze point GP1 and the displacement of the display unit 150 can be calculated as the difference between the instantaneous phase angle $p_d$ (t) of the measured displacement d(t) and the instantaneous phase angle $p_g$(t) of the measured change in gaze g(t):

$$p(t)=p_g(t)-p_d(t)$$

The derived phase difference p(t) may be expressed in the units of degree or radians.

Based on the derived phase difference p(t), the control system 157 can determine whether the measured change in the position for the first gaze point GP1 and the measured displacement of display unit 150 are out of synchronization by comparing the phase difference p(t) to a threshold value $p_{max}$.

More precisely, if the instantaneous phase difference p(t) exceeds $p_{max}$, if p(t) is positive, or is less than $-p_{max}$, if p(t) is negative, it is determined that the measured change in the position for the first gaze point GP1 the measured displacement of the display unit 150 are out of synchronization. Consequently, the control system 157, for example the control unit 160 therein, generates the first control signal C1 accordingly, i.e. aiming at adjusting the at least one suspension characteristic F in such a manner that the phase difference between the measured change in the position for the first gaze point GP1 and the measured displacement of the display unit 150 is reduced.

As an alternative to the above, the condition for the phase difference p(t) may be expressed in terms of its absolute value |p(t)| according to the following: if the absolute value of the instantaneous phase difference |p(t)| exceeds $p_{max}$ it is determined that the measured change in position for the first gaze point GP1 and the measured displacement of display unit 150 are out of synchronization, and the control system 157 generates the first control signal C1 accordingly.

The threshold value $p_{max}$ for the derived phase difference may either be predefined, or learned (i.e. set adaptively). For example, if the first user 110 repeatedly stops viewing the display unit 150 when the derived phase difference p(t) has reached approximately the same value, the control system 157 may be configured to conclude that the first user 110 stops viewing content thereon because the readability has deteriorated to an unacceptably low level. Hence, by storing a history of values for the instantaneous phase difference p(t) when the first user 110 stops viewing the display unit 150, a suitable threshold value $p_{max}$ for the derived phase difference may be established as an average value, a lower bound, or by performing a statistical analysis of the stored values.

As is known in the field of signal processing, in order to derive the phase difference p(t) as is described above, signals g(t) and d(t) may need to be filtered so as remove noise and limit the range of frequency components present in the signals. In practice, this may be achieved by applying Finite Impulse Response (FIR) filters or Infinite Impulse Response (IIR) filters to signals g(t) and d(t).

An alternative to deriving the phase difference by means of Hilbert transforms, a phase detector or phase comparator may be employed, as is known in the art. These may be implemented as analog circuits which generate a voltage signal representing the phase difference between two signals. The so-called type-II phase detector is sensitive only to the relative timing of the edges of the input signals and produces a constant output proportional to the phase difference when both signals are at the same frequency.

Another alternative way to determine that the change in the position for the first gaze point GP1 and the displacement of display unit 150 are out of synchronization is to measure an amplitude and/or a frequency of the displacement of the personnel site 120, and determine that the change in the position for the first gaze point GP1 and the displacement of display unit 150 are out of synchronization if at least one of the measured amplitude and the measured frequency of the displacement of the personnel site 120 exceeds a threshold value. In such a case, instead of establishing that the change in the position for the first gaze point GP1 and the displacement of the display unit 150 are out of synchronization by deriving the phase difference between two signals, g(t) and d(t), parameters characterizing the displacement of the personnel site 120 are used to indicate an out-of-synchronization condition. In practice, the amplitude and/or the frequency of the displacement of the display unit 150 may be extracted from g(t). The threshold values for amplitude and/or frequency may either be predefined or learned, for instance, similar to what is described above. Thus, by storing a history of values for the amplitude and/or frequency when the first user 110 stops viewing the display unit 150, suitable threshold values may be established as average values, lower bounds, or by performing a statistical analysis of the stored values.

FIG. 1 illustrates a first embodiment of a proposed design. Here, the control unit 160 may contain a processing means with a at least one processor 163, such as one or more general purpose processors, and a data carrier 165 in the form computer-readable storage medium, such as a Random Access Memory (RAM), a Flash memory, or the like. The data carrier 165 contains computer-executable instructions 167, i.e. a computer program, for causing the control system 157 to perform in accordance with the embodiments of the invention as described herein, when the computer-executable instructions 167 are executed on the at least one processor 163 of the control unit 160.

As will be described below with further reference to FIG. 4, the control unit 160 may also include interfaces 410, 421, 422 and 440 for receiving signals and data Dgp1, MH1 and MD1 and for outputting the first control signal C1.

More precisely, according to one embodiment of the invention, the control unit 160 for the suspension system of a motor vehicle, is configured to adjust at least one suspension characteristic F between the frame 130 and a personnel site, e.g. represented by the seat 120, while the motor vehicle.

Here, the control unit 160 contains means 410, 420 and 430 respectively, for, while the motor vehicle is being operated, performing the following actions. The means 410, which may be represented by an interface, repeatedly obtains gaze-point data Dgp1 representing the first user's gaze point GP1 on the display unit 150. The means 420, which may be represented by a processor, e.g. a general processing unit (GPU), provides an analysis of variations in a position for the first gaze point GP1 over time. The means 430, which may be represented by a signal processor, e.g. a digital signal processor (DSP), generates the first control signal C1 to the suspension system in response to this analysis. The first control signal C1 is adapted to adjust at least one of the at least one suspension characteristic F between the frame 130 and the personnel site 120 so as to reduce a fluctuation of the position for the first gaze point GP1, if a repositioning of the first gaze point GP1 is out of synchronization with a displacement of the display unit 150. Preferably, the means 430 for generating the first control signal C1 is adapted to generate the first control signal C1 aiming at adjusting the at least one suspension characteristic F in such a manner that the phase difference between the measured change in the position for the first gaze point GP1 and the measured displacement of the display unit 150 is reduced.

According to one embodiment of the invention, the means 420 for providing the analysis of the variations in the position for the first gaze point GP1, in turn, contains means 425 for determining that the repositioning of the first gaze point GP1 is out of synchronization with the displacement of the display unit 150 if a phase difference between a measured change in the position for the first gaze point GP1 and a measured displacement of the display unit 150 exceeds a threshold value THV.

The means 420 for providing the analysis of the variations in the position for the first gaze point GP1 may, in turn, contain: means 421 for obtaining first measurements of movements MH1 of the personnel site 120 relative to the frame 130; means 422 for obtaining second measurements of movements MD1 of the display unit 150 relative to the frame 130; and means 423 for determining the threshold value THV based on the first and second measurements.

Moreover, the means 430 for generating the first control signal C1, may, in turn, contain means 435 for generating the first control signal C1 iteratively in response to the analyzing of the variations in the position for the first gaze point GP1.

The means 410, 420, 421, 422, 423, 425, 430 and 435, as well as any additional modules in the control unit 160, e.g. an output interface 440 for the first control signal C1, may be implemented by any kind of electronic circuitry, for instance any one, or a combination of, analog electronic circuitry, digital electronic circuitry, and at least one processor executing a suitable computer program. In other words, the means 410, 420, 421, 422, 423, 425, 430 and/or 435 may all in one embodiment be embodied as hardware circuits, such as Application Specific Integrated Circuits (ASICs) and DSPs, and in another embodiment be embodied as software instructions executable by at least one processor, which may be a general purpose processor.

FIG. 2 illustrates one embodiment of the invention, where a second user 210 is presumed to occupy a second seat 220 of a motor vehicle 100. The second seat 220 is individually suspended to the frame 130 via a suspension system 142 separate from the suspension system 141 via which the first seat 120 is adjustably suspended to the frame 130.

Here, either a separate eye-tracking system is used for the second user 210, or the above-mentioned eye-tracking system 155 is further configured to, while the motor vehicle 100 is being operated, also repeatedly determine a second gaze point of the second user 210 on a second display unit. The second display unit, in turn, may either be represented by the display unit 150, or by another display unit 250 in the motor vehicle 100, mounted therein or handheld. The control system 157 is further configured to analyze variations in a position for the second user's 210 gaze point over time on the second display unit, and in response thereto, analogous to what has been described above, generate a second control signal C2 to the second suspension system 142 so as to reduce a fluctuation of the position for the second user's 210 gaze point on the second display unit, if a repositioning of the second user's 210 gaze point is out of synchronization with a displacement of the second display unit, for example 250.

According to one embodiment of the invention, the frame 130 further contains a wheel suspension system 280 configured to allow adjustable movements of at least one wheel, here exemplified by 281 and 282, of the motor vehicle 100 between the frame 130 and a support upon which the motor vehicle 100 is operated, for instance a road surface or terrain ground.

Preferably, the control unit 160 is here configured to generate a fourth control signal C4 to the wheel suspension system 280, which signal C4 causes adjustment of at least one suspension characteristic in the wheel suspension system 280 so as to further reduce the fluctuation of the position for the first gaze point GP1. Similar to the above-described adjustments of the suspension characteristics resulting from the first and second control signals C1 and C2 respectively, the fourth control signal C4 may lead to somewhat less comfort for the vehicle travelers. Therefore, the control signals C1, C2 and C4 should be generated as a tradeoff between readability on the display units and comfort.

Figure 3:
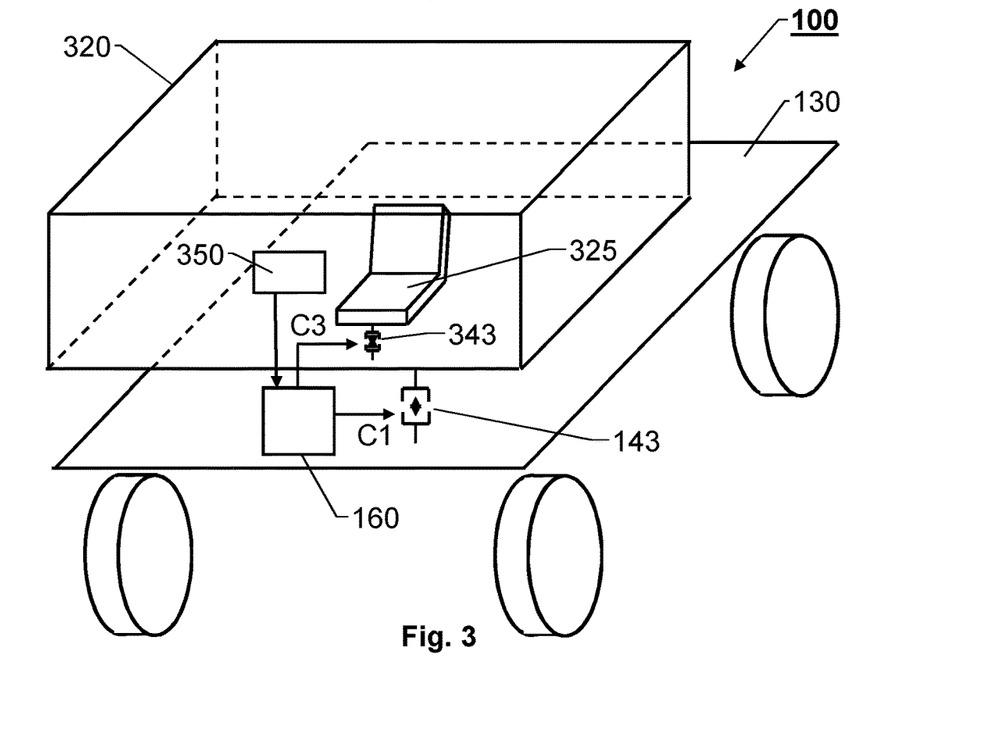
FIG. 3 illustrates one embodiment of the invention, where a cab is adjustably suspended to the frame, and the cab is configured to be occupied by the first user.

FIG. 3 illustrates one embodiment of the invention, where a cab 320 is adjustably suspended to the frame 130 via a suspension system 143. The cab 320, in turn, is configured to be occupied by the first user 110 and possibly one or more additional subjects. Thus, here, the personnel site is represented by the cab 320, which is movable relative to the frame 130.

The cab 320 preferably contains a seat 325 configured to support the first user 110. The seat 325, in turn, may be individually suspended relative to the cab 320 via an auxiliary suspension system 343. Here, the control unit 160 may be further configured to generate a third control signal C3 to the auxiliary suspension system, which signal C3 causes adjustment of at least one suspension characteristic in the auxiliary suspension system 343 so as to further reduce the fluctuation of the position for the first gaze point GP1. Of course, any additional seats included in the cab 325 may be suspended in manner analogous to the seat 325, for example via individual suspension systems as illustrated in FIG. 2.

In further analogy to the adjustments of the suspension characteristics resulting from the control signals C1, C2 and C4, the third control signal C3 may also lead to somewhat less comfort for the vehicle travelers. Therefore, the third control signal C3 should likewise be generated as a tradeoff between readability on the display units and comfort.

Figure 5:
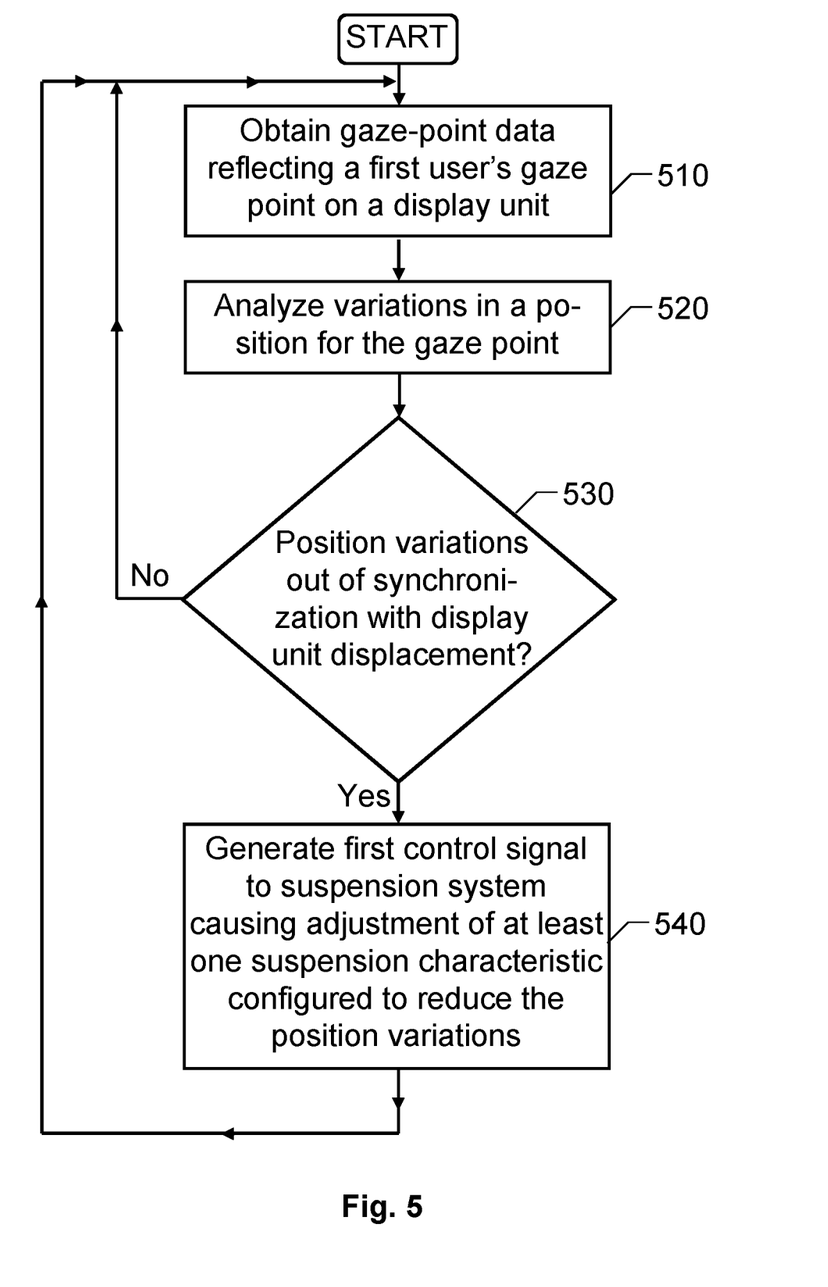
FIG. 5 illustrates, by means of a flow diagram, the general method according to the invention.

In order to sum up, and with reference to the flow diagram in FIG. 5, we will now describe the general method according to the invention for controlling a suspension system between a frame and a personnel site of a motor vehicle while the motor vehicle is being operated. The personnel site may contain a seat or a cab, which is occupied by at least a first user.

In a first step 510, gaze-point data are obtained reflecting the first user's gaze point on a display unit in the motor vehicle. The gaze-point data are updated repeatedly, preferably at a rate, being sufficiently high for discriminating the typical saccades of human-eye movements, i.e. at least in the order of kHz. According to one embodiment of the invention, the gaze-point data are registered by an eye-tracking system included in the motor vehicle.

Then, in a step 520, the variations in a position for the gaze point over time are analyzed. Specifically, in a subsequent step 530, it is checked if the position variations of the gaze point are out of synchronization with a displacement of the display unit. Namely, if the position variations of the gaze point are out of synchronization with a displacement of the display unit, it is reasonable to believe that the gaze fluctuation results from movements of the first user's head relative to the display unit, which movements, in turn, are caused by the operation of the motor vehicle (and for example do not constitute saccades).

If, in step 530, it is determined that the position variations of the first gaze point are out of synchronization with the displacement of the display unit, a step 540 follows. Otherwise, the procedure loops back to step 510.

In step 540, a first control signal to the suspension system is generated, which first control signal causes adjustment of at least one suspension characteristic between the frame and the personnel site. Specifically, the first control signal is generated so as to reduce the fluctuation of the position for the first gaze point determined in step 530.

All of the process steps, as well as any sub-sequence of steps, described with reference to FIG. 5 above may be controlled by means of at least one programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A motor vehicle comprising:
 a display unit configured to present information to a first user,
 a personnel site configured to be occupied by the first user,
 a frame carrying the personnel site, and
 a suspension system configured to adjust at least one suspension characteristic between the frame and the personnel site while the motor vehicle is being operated,
 the motor vehicle further comprises a control system configured to, while the motor vehicle is being operated:
  repeatedly determine a first gaze point of the first user on the display unit,
  analyze variations in a position for the first gaze point over time, and in response thereto generate a first control signal to the suspension system so as to reduce a fluctuation of the position for the first gaze point with respect to the display unit, if a repositioning of the first gaze point is out of synchronization with a displacement of the display unit,
 the suspension system is further configured to adjust the at least one suspension characteristic based on the generated control signal,
 wherein the variations in the position for the first gaze point come from movements of the personal site relative to the frame or movements of the display unit relative to the frame.

2. The motor vehicle according to claim 1, wherein the control system is configured to determine that the repositioning of the first gaze point is out of synchronization with the displacement of the display unit if a phase difference between a measured change in the position for the first gaze point and a measured displacement of the display unit exceeds a threshold value.

3. The motor vehicle according to claim 2, wherein the first control signal aims at adjusting the at least one suspension characteristic in such a manner that the phase difference between the measured change in the position for the first gaze point and the measured displacement of the display unit is reduced.

4. The motor vehicle according to claim 2, wherein the analysis of the variations in the position for the first gaze point over time comprises:
 measuring movements of the personnel site relative to the frame,
 measuring of movements of the display unit relative to the frame, and based thereon determining the threshold value.

5. The motor vehicle according to claim 1, wherein the control system is configured to generate the first control signal iteratively in response to the analysis of the variations in the position for the first gaze point.

6. The motor vehicle according to claim 1, wherein the control system comprises:
 an eye-tracking system configured to determine the first gaze point, and
 a control unit configured to:

receive a first output signal from the eye-tracking system, the first output signal reflecting the position for the first gaze point on the display unit, and
generate the first control signal based on the first output signal.

7. The motor vehicle according to claim 1, wherein the personnel site comprises a first seat configured to support the first user, the first seat being individually suspended relative to the frame via the suspension system.

8. The motor vehicle according to claim 7, wherein the personnel site comprises a second seat configured to support a second user, the second seat being individually suspended relative to the frame via a second suspension system, the eye-tracking system being further configured to, while the motor vehicle is being operated, repeatedly determine a second gaze point of the second user on a second display unit either represented by said display unit or by another display unit comprised in the motor vehicle, the control system being further configured to analyze variations in a position for the second user's gaze point over time on the second display unit, and in response thereto generate a second control signal to the second suspension system so as to reduce a fluctuation of the position for the second user's gaze point on the second display unit, if a repositioning of the second user's gaze point is out of synchronization with a displacement of the second display unit.

9. The motor vehicle according to claim 1, wherein the personnel site comprises a cab configured to carry at least one seated person, the cab being movable relative to the frame and suspended thereto via the suspension system.

10. The motor vehicle according to claim 9, wherein the cab comprises a seat configured to support the first user, the seat being individually suspended relative to the cab via an auxiliary suspension system.

11. The motor vehicle according to claim 10, wherein the control unit is further configured to generate a third control signal to the auxiliary suspension system causing adjustment of at least one suspension characteristic therein so as to further reduce the fluctuation of the position for the first gaze point.

12. The motor vehicle according to claim 1, wherein the frame comprises a wheel suspension system configured to allow adjustable movements of at least one wheel of the motor vehicle between the frame and a support upon which the motor vehicle is operated.

13. The motor vehicle according to claim 12, wherein the control unit is further configured to generate a fourth control signal to the wheel suspension system causing adjustment of at least one suspension characteristic therein so as to further reduce the fluctuation of the position for the first gaze point.

14. A method of controlling a suspension system between a frame and a personnel site of a motor vehicle while the motor vehicle is being operated,
characterized by:
obtaining, repeatedly, gaze-point data reflecting a first gaze point of a first user on a display unit in the motor vehicle;
analyzing variations in a position for the first gaze point over time; and in response thereto generating a first control signal to the suspension system causing adjustment of at least one suspension characteristic between the frame and the personnel site so as to reduce a fluctuation of the position for the first gaze point with respect to the display unit, if a repositioning of the first gaze point is out of synchronization with a displacement of the display unit,
wherein the adjustment of the at least one suspension characteristics is based on the generated first control signal,
wherein the variations in the position for the first gaze point come from movements of the personal site relative to the frame or movements of the display unit relative to the frame.

15. The method according to claim 14, comprising:
determining that the repositioning of the first gaze point is out of synchronization with the displacement of the display unit if a phase difference between a measured change in the position for the first gaze point and a measured displacement of the display unit exceeds a threshold value.

16. The method according to claim 14, comprising:
generating the first control signal iteratively in response to the analyzing of the variations in the position for the first gaze point.

17. A control unit for controlling a suspension system of a motor vehicle, which suspension system is configured to adjust at least one suspension characteristic between a frame and a personnel site of the motor vehicle while the motor vehicle is being operated, the control unit comprising a processor and a memory, said memory containing instructions executable by said processor whereby said control unit is operative to:
repeatedly obtain gaze-point data representing a first user's gaze point on a display unit in the motor vehicle;
provide an analysis of variations in a position for the first gaze point over time; and
generate a first control signal to the suspension system in response to said analysis, which first control signal is adapted to adjust at least one of the at least one suspension characteristic between the frame and the personnel site so as to reduce a fluctuation of the position for the first gaze point with respect to the display unit, if a repositioning of the first gaze point is out of synchronization with a displacement of the display unit,
the suspension system is further configured to adjust the at least one suspension characteristic based on the generated control signal,
wherein the variations in the position for the first gaze point come from movements of the personal site relative to the frame or movements of the display unit relative to the frame.

18. The control unit according to claim 17, wherein said memory further contains instructions executable by said processor whereby said control unit is operative to provide the analysis of the variations in the position for the first gaze point by determining that the repositioning of the first gaze point is out of synchronization with the displacement of the display unit if a phase difference between a measured change in the position for the first gaze point and a measured displacement of the display unit exceeds a threshold value.

19. The control unit according to claim 18, wherein said memory further contains instructions executable by said processor whereby said control unit is operative to generate the first control signal aiming at adjusting the at least one suspension characteristic in such a manner that the phase difference between the measured change in the position for the first gaze point and the measured displacement of the display unit is reduced.

20. The control unit according to claim 18, wherein said memory further contains instructions executable by said processor whereby said control unit is operative to provide the analysis of the variations in the position for the first gaze point by:
- obtaining first measurements of movements of the personnel site relative to the frame,
- obtaining second measurements of movements of the display unit relative to the frame, and
- determining the threshold value based on the first and second measurements.

* * * * *